United States Patent

[11] 3,602,603

| [72] | Inventors | Shunichi Fukasu;<br>Takashi Hosogai, both of Hitachi-shi, Japan |
|---|---|---|
| [21] | Appl. No. | 851,706 |
| [22] | Filed | Aug. 20, 1969 |
| [45] | Patented | Aug. 31, 1971 |
| [73] | Assignee | Hitachi, Ltd.<br>Tokyo, Japan |
| [32] | Priority | Aug. 30, 1968 |
| [33] | | Japan |
| [31] | | 43/61789 |

[54] APPARATUS FOR OPERATING A WATER TURBINE
18 Claims, 6 Drawing Figs.

[52] U.S. Cl. .................................................. 415/38,
416/44
[51] Int. Cl. ......................................................F01b 25/06,
F01d 17/06, F03b 15/08
[50] Field of Search .......................................... 415/38, 40;
416/44

[56] References Cited
UNITED STATES PATENTS
753,773  3/1904  Wilkinson ................... 415/38
FOREIGN PATENTS
275,288  9/1911  Germany ..................... 415/40
5,317  3/1913  Great Britain ............... 415/38

*Primary Examiner*—Leonard H. Gerin
*Attorney*—Craig, Antonelli, Stewart & Hill

ABSTRACT: A regulating means for water flow in a reversible water pump-turbine having an auxiliary needle valve and a main needle valve wherein during starting-up, only the auxiliary needle valve is operated to finely control the rotational speed of the turbine and after the turbine reaches a synchronizing speed, the regulating means is automatically switched to another mode of operation where only the main needle valve is operated to control the output power of the turbine, whereby the generator driven by the turbine may be smoothly switched into parallel with the transmission line.

INVENTORS
SHUNICHI FUKASU and TAKASHI HOSAGAI

BY Craig, Antonelli, Stewart & Hill
ATTORNEYS

3,602,603

APPARATUS FOR OPERATING A WATER TURBINE

BACKGROUND OF THE INVENTION

This invention relates to an apparatus for operating a water turbine. Movable guide vanes have been mostly employed as a means for adjusting flow in conventional water turbines or water pump-turbines. Sometimes, they have been effectively used also instead of a gate valve for cutting off water flow in a pressure steel pipe. When a pump-turbine is operated as a water turbine generator, the above mentioned movable guide vanes serve to adjust flow in accordance with the frequency fluctuation of the power transmission system so that the output of the water turbine generator may be adjusted properly, while when it is operated as a pump for raising water, the pump discharge is adjusted by means of the movable guide vanes or the gate valve. The conventional guide vanes are driven through pin, link, lever and the like by a servomotor. These mechanical servo elements inevitably take on working gaps between each other with the result that it is very difficult to control accurately small degrees of opening of the guide vanes. This difficulty is multiplied by self-vibration of the guide vanes during the starting-up operation where a small change in the initial degree of opening of the guide vanes causes a great change in water flow and thus the corresponding change in pressure, resulting in vibrational shock to the guide vane. In other words, during the starting-up operation, movable guide vanes tend to self-vibrate due to their own characteristics to flow change and pressure change and their own working gas in mechanical elements. They therefore cannot satisfactorily control accurate rotational speed of the water turbine.

When adjustment of the flow is carried out by means of a conventional butterfly valve during a pumping operation, turbulent flow at the down stream side of the butterfly valve also causes self-vibration of the valve. As a result, not only the efficiency of the butterfly valve is reduced, but also cavitation, erosion and abrasion of the butterfly valve may be promoted.

SUMMARY OF THE INVENTION

According to the invention, water flow adjusting means for a water turbine comprises a main needle valve provided in a penstock in front of a casing of the water turbine, a bypass conduit for connecting the upper flow and the lower flow of the main needle valve, and an auxiliary needle valve provided in the bypass conduit wherein either operation by the main needle valve or operation by the auxiliary needle valve may be selected automatically according to the desired condition of operation.

The invention will be more fully described and other objects and advantages will be apparent to those skilled in the art from the following detailed description when considered with the accompanying drawings.

DETAILED DESCRIPTION OF A PREFERRED EMBODIMENT

Generally speaking, in a pumping-up water plant, water stored in the upper cistern is utilized to operate the water turbine to generate electricity in the water turbine operation and on the other hand, water in the lower cistern is pumped up into the upper cistern in the pumping operation. In the generating operation, therefore, the water level of the upper cistern is gradually going down. Since in the pumping-up water plant the water head is low compared with other type water turbines, such as the Pelton water turbine, these variations in water level have a great influence on the useful water head of the water turbine.

Generally, the degree of opening of an apparatus for adjusting the water flow to drive the water turbine generator at the synchronized speed is called the no-load opening degree of the water turbine.

Figure 5:
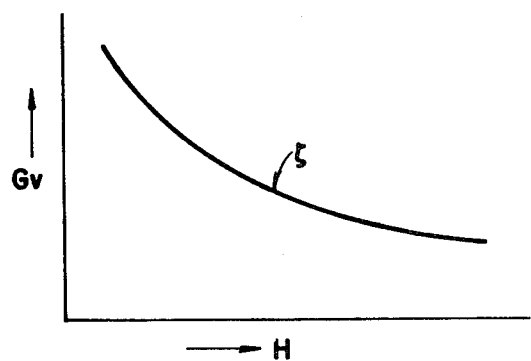
FIG. 5 is a diagram of a characteristic curve $\zeta$, which shows the relationship of the degree of opening GV at no-load plotted against the change of water head H of a reversible water pump-turbine.

The amount of the no-load opening degree is greatly changed in dependence on the useful water head, as illustrated by the curve $\zeta$ in FIG. 5 in which the useful water head H is plotted on the abscissa and the no-load opening degree GV is plotted along the ordinate. As will be clear from the diagram, the no-load opening degree of the minimum water head H min. is several tens of times as large as that of the maximum water head H max.

It is apparent from the foregoing that the large variation of water head presents a serious problem regarding proper control of water turbines, as stated above, and in the case of a pumping water turbine with a great difference between the maximum water head and the minimum water head, control therefor becomes very complex since the opening degree of a water flow adjusting apparatus must be controlled in accordance with the variation of the water head for adjusting water flow to synchronously introduce the water turbine into parallel connection with the transmission line.

The above problem becomes even more difficult to solve by the fact that switching from generating operation to pumping operation in a pumping-up water plant is not always necessitated at the fixed water head in the cistern, such as at the maximum water head H max., but rather is necessitated in consideration of the balance of power demand and supply in the night time and daytime which has no relationship to the variation of water head.

The present invention provides a novel flow adjusting apparatus which can easily solve the above difficulties by employing a novel combination of a main needle valve and an auxiliary needle valve.

Figure 1:
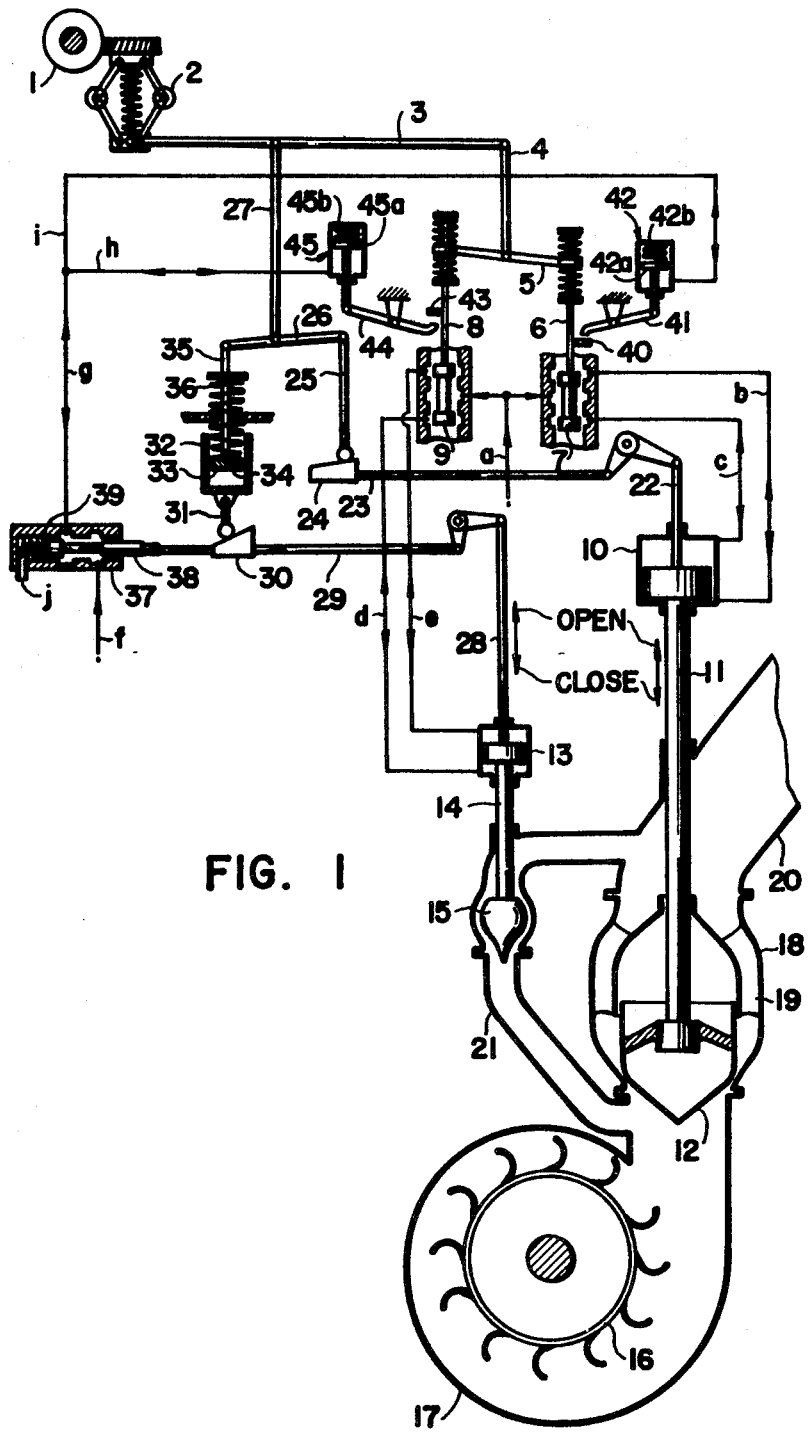
FIG. 1, FIG. 2, FIG. 3, and FIG. 4 are schematic diagrams of various embodiments of a regulating system for operation a reversible water pump-turbine, according to the present invention.

Referring now to FIG. 1, an embodiment of the present invention will be explained wherein driving means 1 drives a centrifugal actuator 2 which detects the variation in speed of rotation, and lever means 3 is connected with the movable end of actuator 2 so as to transmit the displacement thereof to a lever 4 for controlling certain distributing valves. A lever 5 connects lever 4 with spring loaded actuating rods 6 and 8 of main distributing valve 7 and subdistributing valve 9, so as to operate the main distributing valve 7 and subdistributing valve 9 in response to the displacement of actuator 2. A main needle valve 12 is connected with a control rod 11 of main servomotor 10 so as to be driven by the main servomotor 10 which is controlled via lines $b$ and $c$ from the main distributing valve 7.

The water pump-turbine includes a runner 16, a casing 17 about runner 16, and a valve body 18 disposed between a pressure steel pipe 20 and the casing 17. Numeral 19 indicates a portion of valve body 18, which is effective as a guide when the main needle valve 12 is actuated.

An auxiliary pressure steel pipe 21 is connected to the pressure steel pipe 20 to bypass the main needle valve 12 and is provided with the auxiliary needle valve 15 in the middle portion so as to adjust independently of the main needle valve 12 an amount of water flow into the water turbine. The auxiliary needle valve 15 is connected with a control rod 14 of a subservomotor 13, so as to be driven thereby. Like the main servomotor 10, which is operated by the main distributing valve 7, the subservomotor 13 is operated by the subdistributing valve 9.

As previously pointed out, the main servomotor 10 and the subservomotor 13 are driven respectively, by the same centrifugal actuator 2 so that the servomotors 10 and 13 have respective independent resetting means operatively connected with the actuator 2 to provide the independent opening degree against the load. That is, a resetting means comprising resetting levers 22 and 23, and a resetting cam 24, is provided for the main needle valve 12 to reset the movement of the actuator 2 in accordance with movement of the main needle valve 12 and another resetting system is employed to reset the actuator 2 by means of connection of a resetting rod 35 through dashpot means comprising a rod 31, a case 32, a piston 33, and a spring 36 to a resetting cam 30 and resetting rods 28 and 29 connected with the auxiliary needle valve 15.

In water turbine operation, a large valve such as the main needle valve 12 cannot control the speed accurately during starting since a comparatively great proportion of the variation of water flow is produced by a small displacement of the valve in small degrees of opening. As a result, such control of the speed of the actuator 2 tends to be out of stability.

According to the present invention, starting control of the speed is carried out by the auxiliary needle valve 15. In other words, control of the turbine until the synchronized speed is achieved is carried out by the auxiliary needle valve 15 for parallel connection of the generator with the transmission line, and adjustment of the load of the water turbine after completion of parallel connection with the transmission line is carried out by the main needle valve 12.

For the foregoing operation, elastic resetting is added to give stability to the resetting system of auxiliary needle valve 15, and on the other hand, the resetting system of main needle valve 12 provides rigid resetting (speed regulation) for the purpose of load adjustment. Further, the foregoing elastic resetting and rigid resetting are made to act on a resetting lever 27 of actuator 2 so that the main distributing valve 7 or the subdistributing valve 9 may be reset in the neutral position.

The main servomotor 10 and the subservomotor 13 are made so as not to move simultaneously; instead, the subservomotor 13 is first actuated to adjust the speed before the main servomotor 10 is actuated. After parallel synchronized connection with the transmission line, the main servomotor 10 is driven to adjust the load. For such switching operation, a switching valve 37 and control lever means 42, 45 controlling the distributing valves 7 and 9 are provided. A pilot valve 38 of switching valve 37 is always biased to the right side, as seen in FIG. 1, by a spring 39 and may be moved in accordance with the reciprocating movement of resetting lever 29 of auxiliary needle valve 15. Pressure oil $f$ always supplied as illustrated in FIG. 1 is connected through the switching valve 37 with the oil conduit $g$ leading to oil conduits $h$ and $i$ so that a piston 45a in control lever means 45 is moved to the upper movable position against the pressure of a spring 45b and the right side of pivot arm 44 is positioned at the lower position, being out of engagement with a claw 43 on the pilot valve 8 of subdistributing valve 9.

Similarly, control lever means 42 is actuated by pressure oil via conduit $i$ to raise piston 42a to the upper movable position against the pressure of spring 42b and a pivot arm 41 presses down a claw 40 provided on the actuating rod 6 of main distributing valve 7 so as to lock the main distributing valve 7 at the lower position wherein the main servomotor 10 is actuated to close the main needle valve 12 in such a condition, the actuator 2 functions to drive the subdistributing valve 9 and the subservomotor 13 in accordance with speed error signals and the main needle valve 12 is set completely at the closed position.

On the other hand, during parallel connection with the transmission line, when the subservomotor 13 has reached a predetermined opening degree, the resetting lever 29 of sub-servomotor 13 is moved to the extreme right side. In accordance with this movement of resetting lever 29, the pilot valve 38 moves to the right so as to shut off connection between oil source $f$ and conduit $g$ and to connect oil conduit $g$ to a drain passage $j$. Consequently, pressure oil in the conduit $g$ is drained therethrough.

Therefore, the piston 42a in control lever means 42 is simultaneously pressed down by the spring 42b so as to unlock the main distributing valve 7, and similarly, the piston 45a is pressed down by the spring 45b, resulting in locking of the subdistributing valve 9. Thus, the main distributing valve 7 is connected with the actuator 2 and is driven thereby while the valve 9 and subservomotor 13 are blocked. From the foregoing, it will be appreciated that the main servomotor 10 and the subservomotor 13 are alternatively locked so as to be nonresponsive to the operation of actuator 2 in accordance with the present invention.

In the resetting action from the subservomotor 13 to the actuator 2, rod 25 in the resetting system of main servomotor 10 functions as a fixed fulcrum for the resetting lever 27. On the other hand, in the resetting action from the main servomotor 10 to the actuator 2, the resetting rod 35 of the dashpot in the resetting system of auxiliary servomotor 13 functions as a fixed fulcrum for the resetting lever 27. Therefore, the main distributing valve 7 of the subdistributing valve 9 is exactly reset in either operation.

FIG. 1 illustrates a case of water turbine operation where the auxiliary needle valve 15 is controlled by means of centrifugal actuator 2 so as to adjust the speed of rotation of the water turbine for parallel connection with the transmission line while the main needle valve 12 is closed so as to shut off water flow in a pressure steel pipe, and adjustment of water flow is totally done by the auxiliary needle valve 15.

When the auxiliary needle valve 15 moves in the opening direction and reaches a predetermined position, the subdistributing valve 9 is locked and the auxiliary needle valve 15 is set at the closed position and at the same time, the main distributing valve 7 is operatively connected with the actuator 2 and the main needle valve 12 is driven in accordance with movement of actuator 2.

In pumping operation, a generator is switched into a motor to drive the runner as in the pump operation, wherein adjustment of speed is not normally required and the main needle valve 12 controls the output flow of the pump according to a load controlling apparatus not disclosed, independently of the control apparatus illustrated.

Switching from water turbine operation to pumping operation will be further described with reference to FIG. 3. First, a controlling apparatus such as a speed controlling system, a load restricting system or a magnetic valve means stops the centrifugal actuator 2, and thereafter an electronmagnetic coil 46 is energized to move a pilot valve 48 upwardly. As a result, pressure oil introduced into oil conduit $h$ may be drained through oil conduits $l$ and $m$.

Accordingly, the auxiliary distributing valve 9 is moved upwardly and locked at the closed position and the auxiliary needle valve 15 is set to be fully closed and pumping flow is controlled by means of the main needle valve 12 in the pumping operation.

From the foregoing, it will be appreciated that according to the present invention, only the auxiliary needle valve is employed during starting to control the speed of the water turbine so that fine adjustment of the speed may be achieved and the period required for synchronization with the transmission line is greatly shortened. Furthermore, after parallel connection with the transmission line, water flow is controlled only by the main needle valve in accordance with control signals in which, due to the valve characteristics of the needle valve, loss due to vibration of the valve is very small and smooth control is accomplished.

Figure 2:
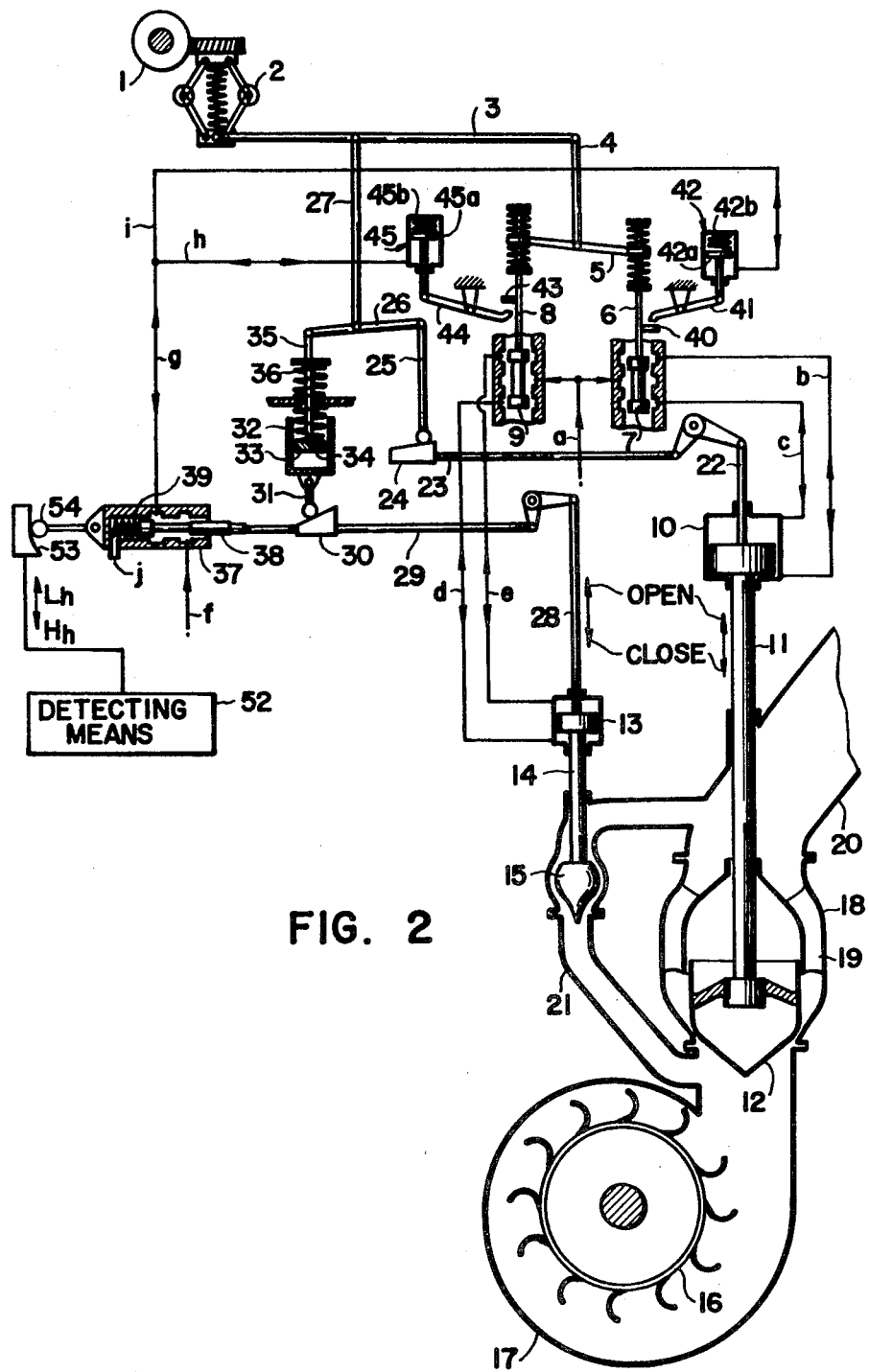

FIG. 2 illustrates an embodiment of the present invention in which needle valve operation and auxiliary needle valve operation are properly switched to each other according to the variation of water head.

As pointed out previously, the no-load valve opening of a water turbine is remarkably changed according to variations in water head. Therefore, it is necessary to properly control the switching timing according to the variations in the water head. The switching valve 37 may be reciprocated by means of a roller 54 movably contacted by a cam 53 which is moved upwardly and downwardly in accordance with variations in water head, by means of detecting means 52 detecting the water head.

In case of an increase in water head, detecting means 52 pulls the cam 53 downwardly and in case of a decrease in water head said means pushes said cam upwardly. Accordingly, the switching valve 37 is moved to the right, as seen in the figure, in the case of water head increase, and in the case of water head decrease, it is moved to the left direction so as to control the timing of switching from the auxiliary needle valve operation to the main needle valve operation. Since the operation and function of the remainder of the apparatus is similar to that explained in connection with FIG. 1, it will be appreciated that auxiliary needle valve operation is switched properly to main needle valve operation with this control arrangement.

By the way, the configuration of cam 53 is determined from characteristic curve $\zeta$ which shows no-load valve opening degrees of a water turbine for values of water head, as illustrated in FIG. 5.

Figure 4:
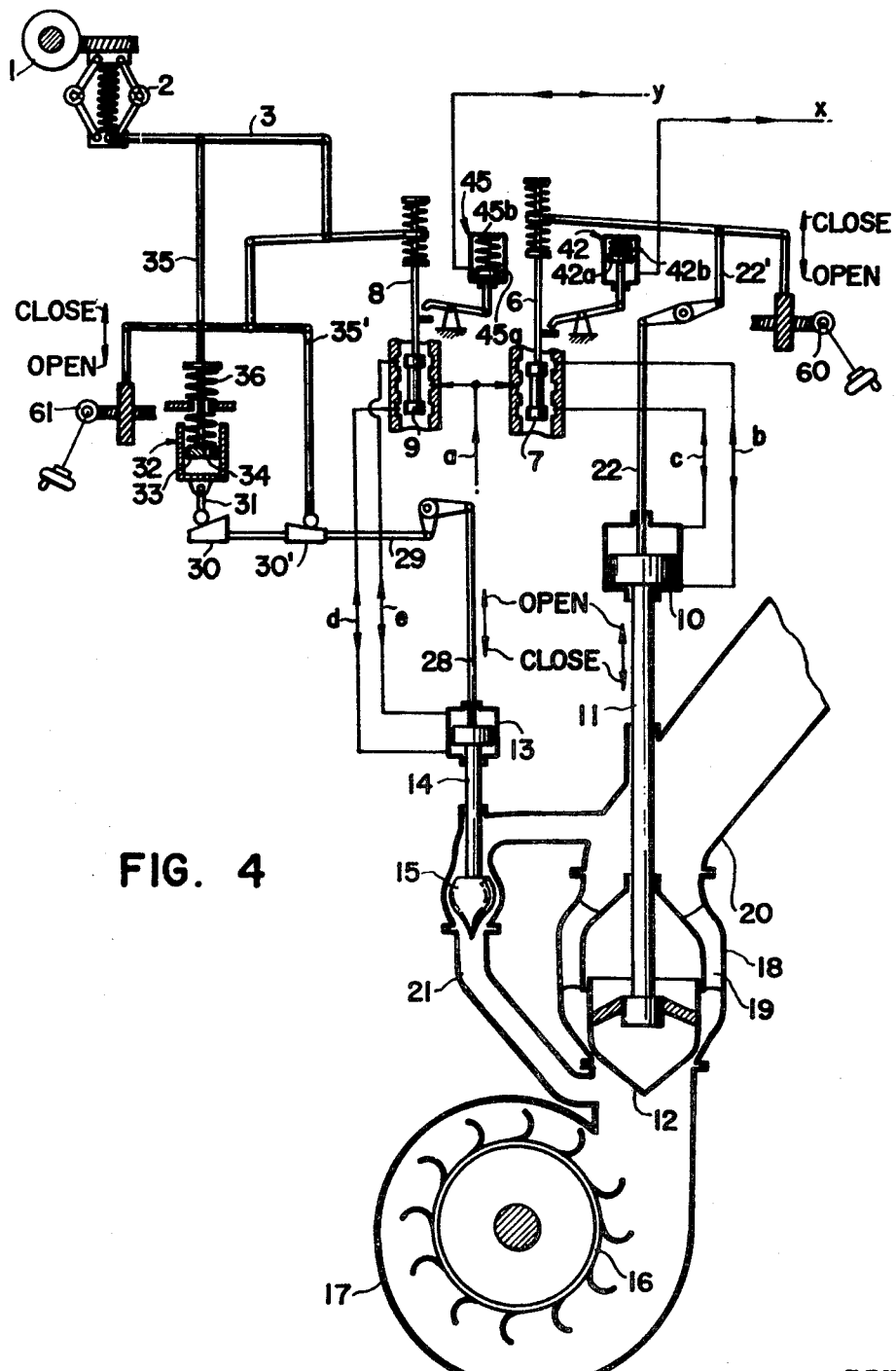

Instead of the actuator control system, a load restricting apparatus 60 may control the main needle valve while the auxiliary needle valve 15 may be controlled through the foregoing elastic resetting system. This control system is illustrated in FIG. 4, wherein the auxiliary needle valve 15 is driven by a control system including an elastic resetting system to give stability to control of water flow till synchronization of the water turbine with the transmission line and thereafter only the main needle valve 12 is employed to control water flow according to load required by a load restricting apparatus, with the actuator 2 switched off.

Operation of the control system is as follows: the auxiliary needle valve 15 is gradually opened according to actuator control up to the synchronization speed after a operation stopping apparatus 61 is relieved. Of course, in this period lever control means 45 for the subdistributing valve 9 is released and the main distributing valve 7 is locked at the closed position by means of lever control means 42. While the auxiliary needle valve 15 is being opened to a predetermined opening degree (water turbine synchronization speed), runner speed is controlled by means of the aforementioned elastic resetting system.

After synchronization with the transmission line, a load is connected to the water turbine and a load restricting apparatus 60 is operated so as to control the opening degree of main needle valve 12. In this period, the auxiliary needle valve 15 may be either opened or closed. Of course, lock means 42 is released to open the main needle valve 7.

Figure 6:
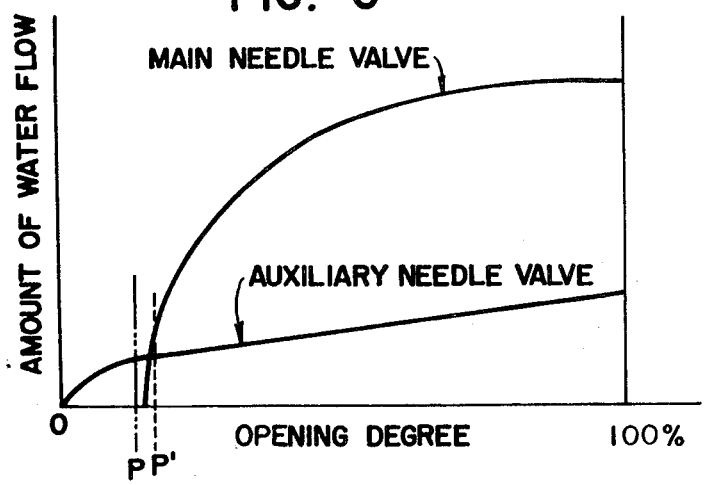
FIG. 6 is a diagram which illustrates the amount of water flow for various degrees of opening of the main needle valve and the auxiliary needle valve, and the period during which it is desirable to switch control of the system and connect a load to the generator.

Switching time period P from the auxiliary needle valve operation to the main needle valve operation is so determined, as shown in FIG. 6, that the water turbine generator may be connected with the transmission line without an electrical disturbance. Therefore, the timing P is selected such that actual switching of the generator to the transmission line P' is, to a degree corresponding with electrical and mechanical operation delays or dead times, later than the switching time period P.

Figure 3:
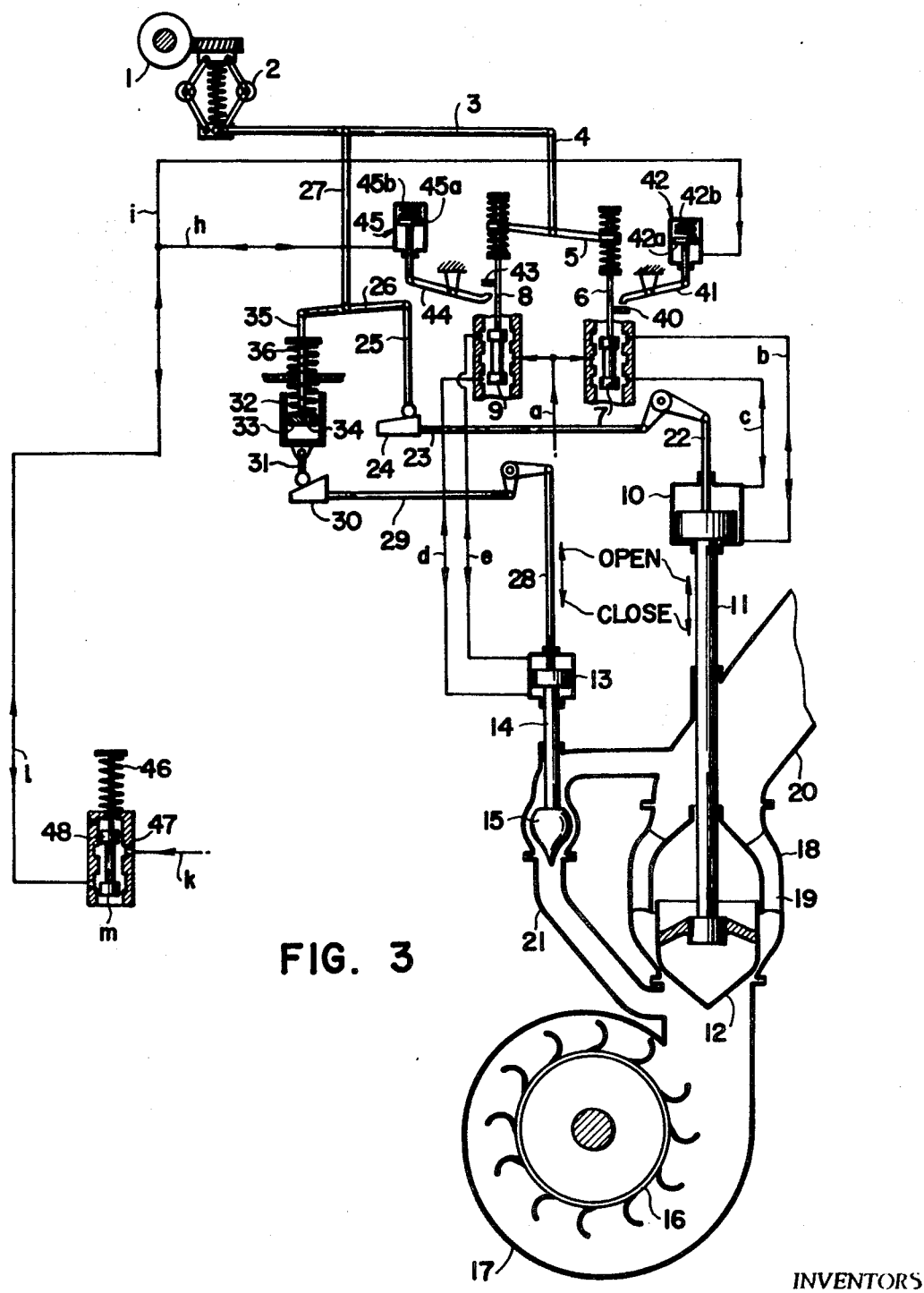

Although the embodiment illustrated in FIG. 4 is manually operated, it may easily be operated automatically by employing the switching valve means 37 as shown in FIGS. 1, 2 and 3. Pressure oil lines $x$ and $y$ introduced into lever control means 42 and 45 may be provided from an oil pressure reservoir and although not illustrated, supply and drain of them may be automatically controlled by means of a suitable means as explained in connection with FIGS. 1, 2 and 3.

In FIG. 4, since it is unnecessary to employ two resetting systems for the main needle valve 12 and the auxiliary needle valve 15 to the actuator 2, the overall control system is quite simple in comparison with the prior embodiments.

Since many modifications and variations may be made in the described apparatus without departing from the spirit of the invention, the foregoing description is to be considered as exemplary and not in a limiting sense. It is, therefore, to be understood that many changes may be made in the particular embodiment disclosed which are within the full intended scope of the invention as defined by the appended claims.

What we claim is:

1. In an apparatus for operating a water turbine having an adjusting means for adjusting the amount of water flow into a runner and control means for controlling the adjusting action of said adjusting means, the improvement being characterized in that said adjusting means is comprised by auxiliary inlet pipe means for finely adjusting said amount of water flow to the turbine having auxiliary needle valve means therein and main inlet pipe means for roughly adjusting said amount of water flow to said turbine having main needle valve means.

2. An apparatus for operating a water turbine according to claim 1, wherein said control means is provided to control both said auxiliary needle valve means and main needle valve means, selectively and alternatively, in such a manner that said main needle valve means is actuated only after said auxiliary needle valve means acts to accelerate the runner from standstill to a speed of rotation suitable for connecting a load to the turbine generator.

3. An apparatus according to claim 2, wherein said control means comprises speed detecting means, first control means operatively connected with said speed detecting means and said auxiliary needle valve means for adjusting water flow so as to control speed of rotation of the water turbine during starting up thereof, and second control means operatively connected with said speed detecting means and said main needle valve means for adjusting water flow so as to control the power output of the water turbine, and said control means further including locking means operatively coupled with said first and second control means for automatically blocking operation of the second control means during the starting up and blocking operation of the first control means after a load is connected to the water turbine.

4. An apparatus according to claim 3, in which the water turbine is a reversible water pump-turbine and only the second control means is made inoperative during the pumping operation.

5. An apparatus according to claim 3, in which said first control means includes an elastic resetting control system for controlling opening of the auxiliary needle valve means in response to the speed detecting means and the second control means includes a rigid resetting control system for controlling opening of the main needle valve means in response to a demand for power.

6. An apparatus according to claim 3, in which the first control means comprises a sub servomotor connected with said auxiliary needle valve means and a subdistributing valve for controlling pressure oil entering into the subservomotor in response to the speed detecting means; said second control means comprising a main servomotor connected with the main needle valve means and a main distributing valve for controlling pressure oil entering into the main servomotor in response to either the speed detecting means or a power limiting means; and the locking means comprises first and second locking members coupled, respectively, with the subdistributing valve and the main distributing valve and first and second lock actuating means operatively connected, respectively, with the first and second locking member and selectively and alternately actuated in response to a predetermined position of the sub needle valve means.

7. An apparatus according to claim 6, further comprising switching means operatively coupled with the first and second lock actuating means and the auxiliary needle valve means for actuating selectively and alternately the first and second lock actuating means as the auxiliary needle valve is opened to a predetermined degree.

8. In a water turbine having a runner, a housing for said runner, a main inlet pipe for water to said runner, main needle valve means for controlling the amount of water flowing through said main inlet pipe, and main actuating means for actuating said main needle valve means, the improvement comprising an auxiliary inlet pipe connected to said main inlet pipe and bypassing said main needle valve means,
auxiliary needle valve means disposed in said auxiliary inlet pipe for controlling the amount of water therethrough,
auxiliary actuating means for actuating said auxiliary needle valve means, and
adjusting means for adjusting the flow of water into said runner by effecting coordinate control over said main and said auxiliary control means.

9. The combination defined in claim 8, wherein said adjusting means includes operating means for effecting alternate operation of said main and said auxiliary needle valve means through said main and said auxiliary control means, respectively, so that said auxiliary needle valve means provides the starting control over said turbine and said main needle valve means provides running control thereover.

10. The combination defined in claim 8, wherein said adjusting means further includes speed detecting means, first control means responsive to said speed detecting means for controlling said auxiliary actuating means, second control means responsive to said speed detecting means for controlling said main actuating means, and operating means for selectively rendering said first and second control means alternately operative.

11. The combination defined in claim 9 wherein said operating means includes a first operating device normally inhibiting the operation of and actuatable to release said first control means, a second operating device actuatable to inhibit operation of said second control means, and signal generating means for selectively simultaneously actuating said first and second operating devices.

12. The combination defined in claim 11 wherein said first and second operating devices consist of a spring biased piston in a hydraulic cylinder, a connecting rod connected to the piston, and a lever arm connected to said connecting rod and coupled to an associated one of said first and second control means, said piston being moved against the spring bias upon application to said cylinder of fluid pressure from said signal generating means.

13. The combination defined in claim 12 wherein said main and said auxiliary actuating means each consist of a servomotor, and said first and said second control means consist of first and second hydraulic control valves for controlling operation of said servomotors, respectively.

14. The combination defined in claim 13, wherein said speed detecting means is a centrifugal actuator, and said first and second hydraulic control valves are connected together to said centrifugal actuator by way of a first mechanical linkage.

15. The combination defined in claim 14 wherein said operating means further includes first resetting control means in the form of a second rigid mechanical linkage connected between said servomotor serving as said main actuating means and said centrifugal actuator and second resetting control means in the form of a third mechanical linkage including an elastic member connected between said servomotor serving as said auxiliary actuating means and said centrifugal actuator.

16. The combination defined in claim 15, wherein said signal generating means includes a fluid distributing valve selectively applying fluid pressure to said first and second operating devices and having a control member connected to said second resetting control means.

17. The combination defined in claim 16, wherein said distributing valve is further controlled by cam means connected thereto and actuated by means for detecting the water head to the turbine.

18. The combination defined in claim 13, wherein said speed detecting means is a centrifugal actuator, said first hydraulic control valve is connected to said centrifugal actuator by way of a first mechanical linkage, resetting control means in the form of a second mechanical linkage including an elastic member connected between said servomotor serving as said auxiliary actuating means and said centrifugal actuator, and load restricting means connected to said servomotor acting as said main actuating means for controlling operation thereof.